United States Patent [19]
Marino

[11] 3,942,420
[45] Mar. 9, 1976

[54] SPRAY BOOTH FOR ELECTROSTATIC POWDER COATING

[75] Inventor: Frank P. Marino, Cos Cob, Conn.

[73] Assignee: Interrad Corporation, Stamford, Conn.

[22] Filed: May 6, 1974

[21] Appl. No.: 467,375

[52] U.S. Cl............... 98/115 SB; 52/79; 118/326; 118/DIG. 7; 312/257 A
[51] Int. Cl.$^2$........................................ F23J 11/00
[58] Field of Search.......... 98/115 SB; 52/79; 312/3, 312/4, 257 A, 257 SK, 257 SM; 118/312, 326, DIG. 7

[56] References Cited
UNITED STATES PATENTS

| | | | |
|---|---|---|---|
| 2,263,510 | 11/1941 | Lindsay | 312/257 SM |
| 2,774,808 | 12/1956 | Bullock | 312/357 SM |
| 3,814,002 | 6/1974 | Rombach et al. | 98/115 SB |

Primary Examiner—William F. O'Dea
Assistant Examiner—Ronald C. Capossela
Attorney, Agent, or Firm—Mandeville and Schweitzer

[57] ABSTRACT

The disclosure is directed to a spray booth for electrostatic power coating processes, including a hopper section, and a removably secured housing section. The housing portion consists of a basic skeleton of structural supporting members, to which are removably attached a plurality of standard size panel modules. The panel modules may, for example, be closed wall panels, may include an access door, may provide a sealed access slot for a reciprocating coating applicator, may have louvered air controlled panels, etc. The modular panels may be assembled in various combinations, so that an essentially standard spray booth structure may be easily customized to the specific needs of the user. The spray booth is also constructed and arranged to provide an inwardly shingled relationship of wall forming elements, such that powder overspray tends to fall by gravity into the hopper section of the booth, without contacting any upwardly facing horizontal or near horizontal surfaces.

The new spray booth structure is constructed in a unique manner to provide for relatively higher velocity of downward air flow along the outer walls of the housing and relatively lower velocity of air flow in the central portions, through which the work is being transported. The thus controlled air velocity gradients within the spray booth housing serve to improve coating transfer efficiencies, while at the same time promoting selfcleaning of the booth walls.

The construction and arrangement of the spray booth housing is such as to enable it to be quickly and easily dismantled for clean out purposes.

10 Claims, 11 Drawing Figures

SPRAY BOOTH FOR ELECTROSTATIC POWDER COATING

BACKGROUND AND SUMMARY OF THE INVENTION

One of the important processes for the application of coating materials to commercial products is the use of electrostatic powder coating techniques. Electrostatic coating of products with liquid coating materials is, of course, well known and highly developed. However, the need for using volatile solvents as vehicles in connection with most liquid coating materials presents increasingly difficult problems in terms of solvent recovery techniques and systems, to satisfy antipollution regulations and, more currently, in terms of the difficulty of obtaining the solvent materials in the first instance. These factors, in addition to the fact that certain coating characteristics may not be obtainable with solvent based liquid coating materials have led to an increasingly wide-spread utilization of electrostatic powder coating techniques. In powder coating processes, dry thermoplastic powder is entrained in a directed flow of carrier gas, and the suspended and entrained particles of powder are given a high voltage electrostatic charge much in the same manner as in liquid electrostatic processes. The charged dry particles are thus caused to be attracted to the workpieces to be coated. After application of the coating, the workpiece is exposed to heat to fuse the deposited thermoplastic particles, to thereby achieve the desired homogeneous coating.

As will be appreciated, the application of powder coating materials requires careful control over the flow of powder, so that the powder is properly deposited or permitted to deposit upon the work in the first instance, and is not subsequently blown off of the workpiece by uncontrolled air flows, prior to fusing of the powders. In addition, care must be exercised in and about the spray booth area, so that excess coating material, usually referred to as overspray, does not escape into the general atmosphere of the plant. Thus, it is typical practice to conduct the electrostatic powder coating of workpieces in an enclosed spray booth area which is maintained at a slightly negative pressure relative to the outside ambient, to provide for a general inflow of outside air and thereby minimize or preclude the escape of powder overspray.

The present invention relates to improvements in the construction and arrangement of spray booth assemblies, intended specifically for the confinement, collection and recovery of overspray in powder coating processes, which include a number of improvements and advantages in relation to spray booth structures heretofore known and available.

In accordance with one feature of the invention, a novel and improved spray booth structure is provided which includes means for guiding and directing the flow of air, carrying entrained powder overspray, toward and into exhaust duct areas, from which the air and powder overspray may be withdrawn from the spray booth and processed for recovery of the powder and purification of the air. Of course, the withdrawal of air and overspray for powder recovery is, as a generality, well known. However, the present invention includes specifically novel arrangements for this purpose which provide for controllable and optimum flows of air within the spray booth enclosure, in about the vicinity of the workpiece being coated, such that air velocity in the vicinity of the workpiece is maintained both low and relatively uniform. In this connection, the spray booth structure of the invention includes, among other things, means for encouraging the development of a transverse air velocity gradient within the spray booth area, providing for increased downward air velocity in the vicinity of the spray booth walls and relatively reduced downward air velocity in the immediate vicinity of the workpiece. This has the twofold advantage of minimizing air disturbance around the workpiece, which might otherwise interfere with proper deposition and/or retention of the powder coating material, while at the same time providing for a desirably greater flow velocity along the spray booth walls to minimize the deposition of powder on such walls.

The spray booth structure of the invention is useful to great advantage in connection with conveyor supported workpieces, which are carried through the spray booth area and, while confined within the booth, are exposed to the application of electrostatically charged powder spray particles, typically by means of vertically reciprocating spray devices. Usually a spray booth of the type contemplated by the invention is somewhat elongated in the direction of conveyor travel, and the spray booth structure of the invention advantageously includes overspray recovery means of an improved and optimized form arranged to provide a desired velocity gradient across the width of the booth, as referred to above, while at the same time providing for maximum uniformity of downward air velocity in the lengthwise direction. Thus, ideally, the vertically downward air velocity in the booth in a given vertical plane, extending lengthwise of the spray booth, should be uniform throughout the length of the booth. Such ideals are, of course, not capable of being fully realized. Nevertheless, the apparatus of the invention serves to optimize the air flows in the direction of the desired ideal.

In accordance with another aspect of the invention, a powder containment and recovery booth is provided which is of a highly simplified structural make up and yet which is capable of a modular assembly, such that a single basic booth skeleton may accommodate a wide variety of specific booth structures tailored to the specific needs of the customer.

A further significant feature of the invention resides in the provision of a spray booth intended especially for electrostatic powder coating, and including overspray recovery means, which in addition to having the various advantageous features mentioned above is especially configured and constructed throughout to reduce to an absolute minimum the presence of surfaces within the booth on which powder overspray might collect and be retained, thus interfering with the efficiency of the overspray recovery and complicating clean up of the booth as may be necessary from time to time for color change, for example. The new spray booth thus includes a novel and advantageous "shingle" type of construction in which, wherever practicable, the lower edges of vertical wall panels overlap on the inside of the wall panels or other structure below them, such that upwardly facing horizontal surfaces are substantially avoided. In this connection, the booth construction of the invention, includes a novel arrangement of removable and interchangeable modular wall panels, which can be quickly installed in the desired shingle fashion, such that the modular assembly concept is made fully compatible with the avoidance of powder collecting surfaces.

In accordance with another and more specific feature of the invention, the spray booth structure of the invention may incorporate a variety of special purpose, specifically advantageous wall panel modules. One such wall panel module includes a plurality of downwardly extending, inwardly overlapped louvers, which can be slightly opened, when desired, to provide a controlled, downwardly directed inflow of outside air along selected side walls of the spray booth, forming an effective barrier to prevent or minimize powder overspray particles from coming into contact with such walls. Other special wall panels include an advantageous form of sealing panel permitting the entry and vertical reciprocation of a spray gun or supporting arm for a spray gun, and providing optimum sealing effectiveness without compromising the ability of the spray device to be properly reciprocated.

For a better understanding of the above and other features and advantages of the invention, reference should be made to the following detailed description and to the accompanying drawings.

DESCRIPTION OF A PREFERRED EMBODIMENT OF THE INVENTION

Referring now to the drawings, the reference numerals 10, 11 designate generally upper and lower sections respectively of a spray booth assembly. The lower section, sometimes referred to as the hopper section, includes a plurality of legs or supports 12, to which is welded or otherwise secured an assembly of side rails 13, 14 and end rails 15, 16 comprising a rigid support for the upper or housing section 10 of the booth.

Suspended from the side rails 13, 14 is a hopper bottom structure, generally designated by the numeral 17 and including bottom panel sections 18–21 arranged generally in a cross sectional configuration of a W. At their upper ends, the outer hopper walls 18, 21 are connected to vertical wall sections 22, 23, which extend upward along the inside surfaces of the channels 13, 14, terminating a few inches above the top surfaces of the channels to form a lip (see FIG. 5). To advantage, the vertical wall extensions 22, 23 are simply integral upward extensions of the hopper walls 18, 21.

At each end the hopper bottom 20 is closed off by an end wall panel 24 or 25. The panels 24, 25 typically are welded to the ends of the bottom wall panels 18–21, serving both to close off and add rigidity to the hopper structure. In addition, the end walls 24, 25 include upward extensions 26 extending along the inside channels 15, 16 and sufficiently above the channels to provide, in conjunction with the extensions 22, 23, a hopper lip extending completely around the inside of the channel structure 13–16 and terminating a few inches above it.

Figures 3, 4:
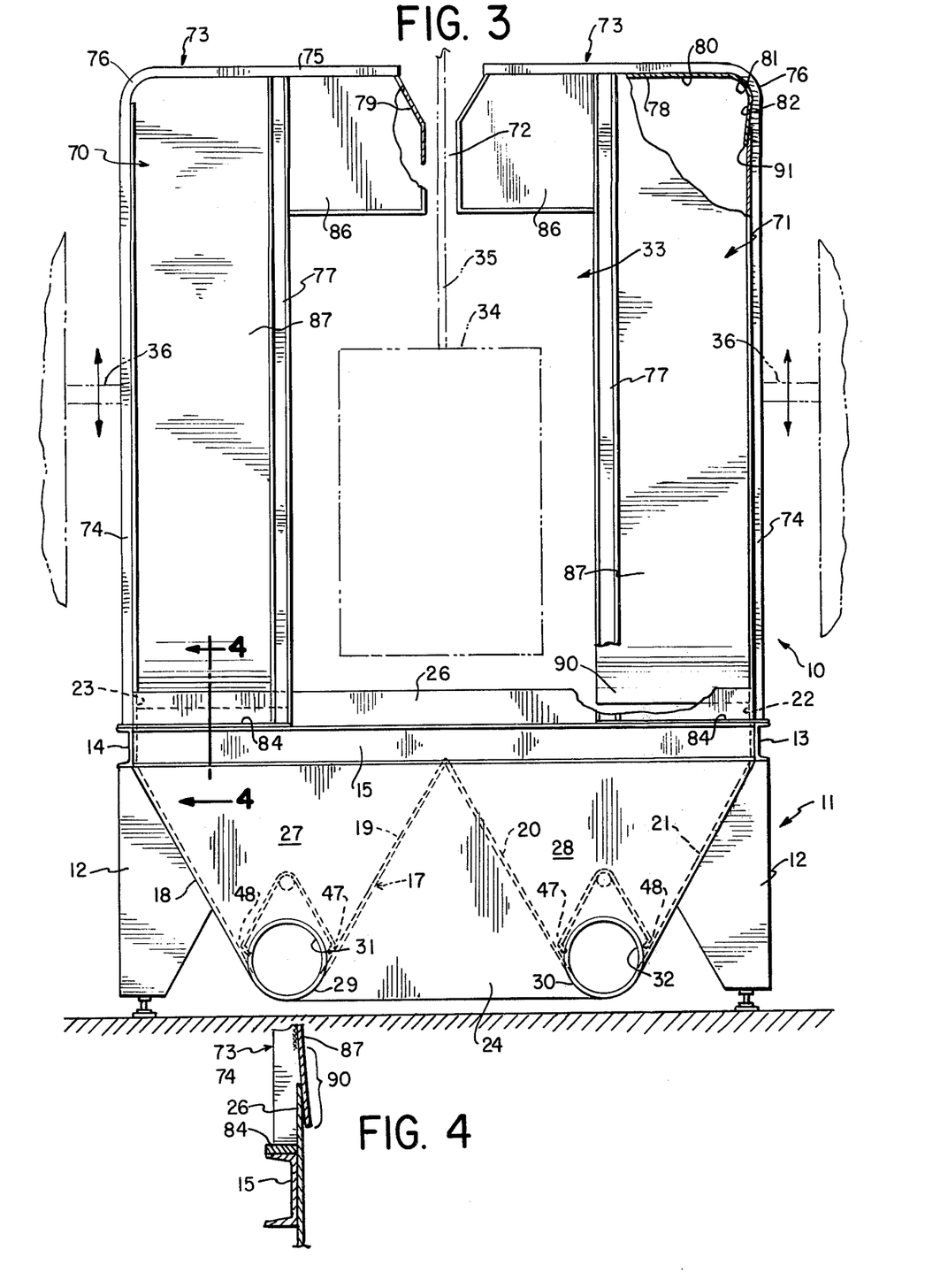
FIG. 3 is an end elevational view of the spray booth structure of FIG. 1.
FIG. 4 is an enlarged, fragmentary, cross sectional view taken generally on line 4—4 of FIG. 3.

As reflected particularly in FIG. 3, the W-shaped hopper bottom forms a pair of hopper sections 27, 28 extending longitudinally from one end to the other of the spray booth. Each of these hopper sections 27, 28 is, to advantage, provided with a radiused bottom wall portion 29, 30. The end wall 24, at one end of the spray booth, is provided with circular openings in which are secured cylindrical outlet duct sections 31, 32. Desirably, the rounded bottom wall extremities of the hoppers 27, 28 are formed with the same radius (e.g., about 4 inches) as the duct sections 31, 32 such that the lower portions of the duct sections form, in effect, continuations of the surfaces of the rounded hopper bottoms. As will be more fully apparent hereinafter, such surface continuity provides for the free and unimpeded outflow of recovered powder overspray from the hopper area, as is desired. In this respect, the conduit sections 31, 32 are, in a typical installation of the spray booth equipment connected to the low pressure side of a suitable blower, which extracts air from within the spray booth at an appropriate volume rate and causes it, with its entrained overspray powder, to be directed through appropriate separating and filter means, forming no part of the present invention and therefore not illustrated. The filter and separating means typically is of several stages, such that the eventual air discharge to the atmosphere is substantially free of the particles, and the latter are suitably collected for processing and reuse.

As will be more fully explained, the outlet ducts 31, 32 constitute the only air outlet from the spray booth structure, and it is intended and contemplated that the air outflows through the duct sections 31, 32 will be at such a velocity rate as to effectively entrain and convey any particles of powder overspray which are collected in the bottoms of the hoppers. For this purpose, it has been found that the horizontal velocity of air flow through the hopper bottom area and out through the duct sections 31, 32 should, for optimum effectiveness, be maintained within the range of from around 3,500 feet per minute to around 4,000 feet per minute. At the same time, air velocities within the upper portion or housing 10 of the spray booth should be substantially limited. Thus, in general, the flow of air through the upper portion 10 of the spray booth is vertically downward, with some horizontal air flow being experienced through the end openings 33 of the housing as well as through access openings, if any, that may be provided along the side wall structure of the housing.

Ideally, the vertical downward velocities of air in the vicinity of a workpiece 34 being carried longitudinally through the booth by a conveyor 35 should not exceed about 60 feet per minute. On the other hand, downward air velocity within the housing 10 but adjacent in side walls can be somewhat higher, and is in fact, in accordance with the invention, controlled to be higher, since it does not adversely affect the coating of the part but does function to advantage in assisting in the continuous cleansing of the side wall areas of the booth. Likewise, horizontal inflows of air, through the end openings, and through any access openings, desirably are kept typically at 100 feet per minute. Experience has indicated that, as long as the air flows are maintained within the before mentioned limits, the spray coating material discharged by the reciprocating spray devices, indicated by the reference numeral 36, can be carried out in a highly efficient and effective manner.

In accordance with one aspect of the invention, each of the respective hopper sections 27, 28 is provided with a two part baffle assembly 37, 38. The baffle assembly for each hopper section is the same, and therefore only one of them will be described specifically.

Figures 5, 6, 10, 11:
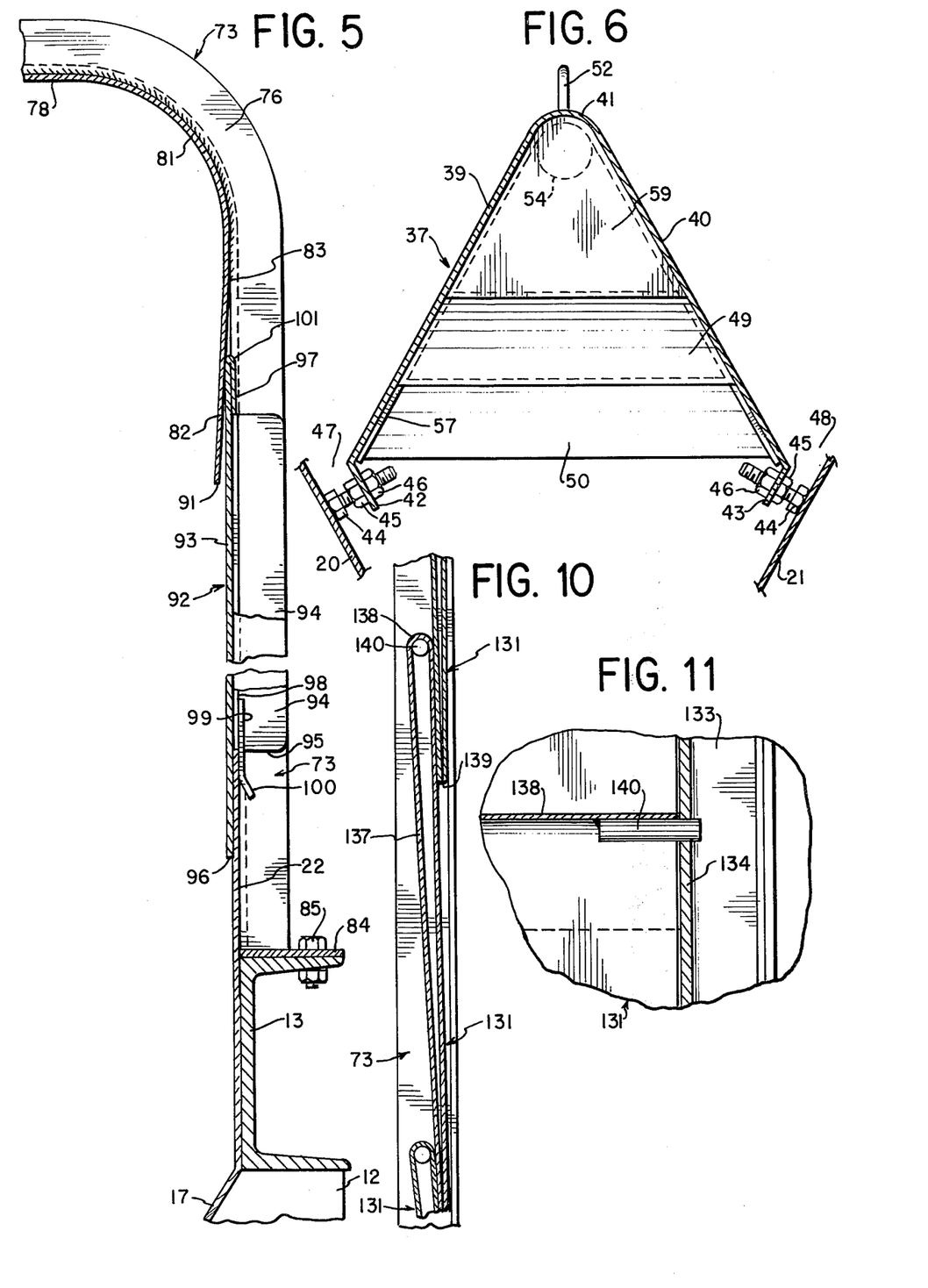
FIGS. 5–10 are enlarged, fragmentary cross sectional views taken generally along lines 5—5 through 10—10 respectively of FIG. 1.
FIG. 11 is an enlarged, fragmentary cross sectional view showing further details of the panel assembly of FIG. 10.

With reference to FIG. 6, each of the principal baffle sections 37, 38 is formed of a section of sheet metal bent into the form of an inverted V, to provide upwardly converging principal side walls 39, 40, a rounded apex area 41, and downwardly converging flange sections 42, 43 at the lower extremities of the side walls 39, 40. At two or more locations along each of the in-turned flanges 42, 43 there are provided adjustable spacing legs 44 which, for convenience may be conventional bolts, which are adjustably secured to the flanges by lock nuts 45, 46. As reflected in FIG. 6, the spacing legs 44 may be adjusted to provide discharge slots 47, 48 of predetermined width extending along the full length of the baffle assembly 37, 38 on each side. In accordance with one of the specific features of the invention, the supporting legs 44 for the baffle assemblies provided in each of the respective hopper sections 27, 28 are so adjusted as to provide for an asymmetrical inflow of air and overspray powder through the respective passages 47, 48. These passages are so adjusted that a substantially greater flow of air, and therefore a greater air flow velocity, is provided through the outer slots 48 than through the inner slots 47. Usually, the slot dimensions will be adjusted throughout the length of the baffle assembly, thus providing uniformity in the downward flow of air over any given longitudinal vertical cross section, while providing for a desired gradient or variation in the velocity of downward air flow in any given transverse vertical cross section. Although the precise adjustment of the supporting legs 44 is somewhat empirical with respect to a specific booth structure, the desired effect typically is achieved by providing a somewhat wider area in the discharge slot 48 and in the inner slot 47.

In order to achieve a uniform velocity flow throughout the length of the spray booth housing, provision is made in the baffle assembly 37, 38 to progressively restrict the cross section of the lower region of the hopper sections 27, 28 which form, in effect, horizontal discharge ducts leading to the outlet duct sections 31, 32. To this end, the baffle sections include horizontal baffle plates 49, 50 extending from one end to the other of the baffle assembly at a slight upward incline from the remote end (right hand in FIG. 1) to the discharge end of the duct passage. By gradually restricting the duct passage area 51 over its length, it is assured that a relatively uniform pressure exists in the region of the discharge slots 47, 48 throughout their full length.

Because the interior of the spray booth housing must be cleaned out from time to time, as when preparing for a color change, for example, the baffle assemblies 37, 38 are of a removable design. To this end, the full length of the baffle structure is made up, in the present instance, of two sections, each provided with handle grips 52 to facilitate handling. At the remote end of the second baffle section 38, there is a recessed end plate 53, which seals off the unused chamber in the upper portion of the baffle section and accommodates the reception of supporting lug 54. The lug 54 is welded or otherwise secured to the hopper end wall 25 and is received within the rounded apex portion 41 of the baffle section (see FIG. 6). The supporting lug 54 serves to loosely support and locate the baffle in a symmetrical location with respect to the hopper side walls, to prevent accidental tilting of the baffle.

In the center region of the hopper section, where the respective baffle sections 37, 38 join, the sections are provided with recessed end walls 55, 56, and the baffle section 38 is provided with a short underlapping extension section 57 projecting beyond the end of its principal side walls 39, 40. The arrangement is such that, a slight gap 58 may be provided between the adjacent ends of the baffle sections 37, 38 to facilitate placement and removal of these sections, with the underlapping extension 57 serving to close off the gap area.

Advantageously, the restricting wall 50 of the baffle section 38 extends to the end of the underlapping section 57, somewhat beyond the end of the principal baffle walls 39, 40. The restricting wall 49, of the other baffle section 37, terminates short of the end of its principal walls 39, 40, but somewhat beyond the end of its recessed end wall 56. The arrangement is such that, with the two baffle assemblies installed in end-to-end relationship, the dividing walls 49, 50 may be substantially butted together, one forming a continuation of the other.

At the discharge end of the baffle section 37, a recessed end wall 59 is provided to connect with the dividing wall 49, forming a recess 60 in the upper portion of the baffle assembly for receiving a supporting or stablizing lug 61. The function of the lug 61 is similar to that of the lug 54 previously described.

To install the baffle assembly 37, 38, the remote end of baffle assembly 38 is first placed in position, butted tightly against the remote end wall 25 of the hopper. The near end baffle assembly 37 is then lowered into position and arranged so that its near end extremity abuts the near end wall 24 of the hopper. The underlapping connecting extension 57 accommodates manufacturing tolerances and thermal or other dimensional changes without compromising the overall integrity and efficiency of the baffle structure.

As reflected in FIG. 4, the maximum width of the baffle assembly 37, 38 desirably is at least slightly greater than the diameter of the discharge duct sections 31, 32. In a typical commercial system of the type illustrated, these ducts may have a diameter of, for example, around 8 inches. With the baffle assemblies in place, each of the hopper sections 27, 28 in itself forms a double hopper section of W-shaped cross section. This arrangement, in conjunction with the provision of asymmetrically dimensioned air discharge slots 47, 48, enables a desired distribution of air velocity across the width of the booth, achieving relatively lower downward velocities in and about the workpiece 34 and relatively higher velocities in the vicinity of the housing side walls. The provision of a multiple section hopper bottom also enables the overall depth of the hopper to be reduced without compromising the self-cleaning characteristics of the hopper walls. In this respect, it is desired to keep the hopper walls at an angle of at least about 60° to the horizontal. Experience has established that by having the hopper walls thus sharply inclined, coating powders typically utilized in industrial applications will slide freely downward into the bottom areas of the discharge trough. When the particles reach the bottom, the significantly higher velocities of air flow there provided assure effective entrainment of the particles and their removal from the spray booth enclosure.

The upper section 10 of the illustrated spray booth is formed in two symmetrical halves 70, 71 providing between them a passage, including end openings 33, for the workpiece 34, and providing a slot-like opening 72 in the top of the housing to accommodate the lengthwise passage of a conveyor element 35. Each of the symmetrical housing halves comprises a plurality of rib elements 73, which may be formed of structural channel or structural tubing, for example, and which include vertical side panel supports 74 and horizontal top panel supports 75 connected by generously curved upper corner sections 76. Desirably, the rib elements 73 are of a suitable size and cross section to have substantial rigidity, so that the upper, horizontal sections 75 are substantially self-supporting in a cantilever fashion. At the end extremities, vertical support elements 77 may be provided to add rigidity to the end most ribs 73, as well as provide support for end panels of the housing, to be described.

Figure 2:
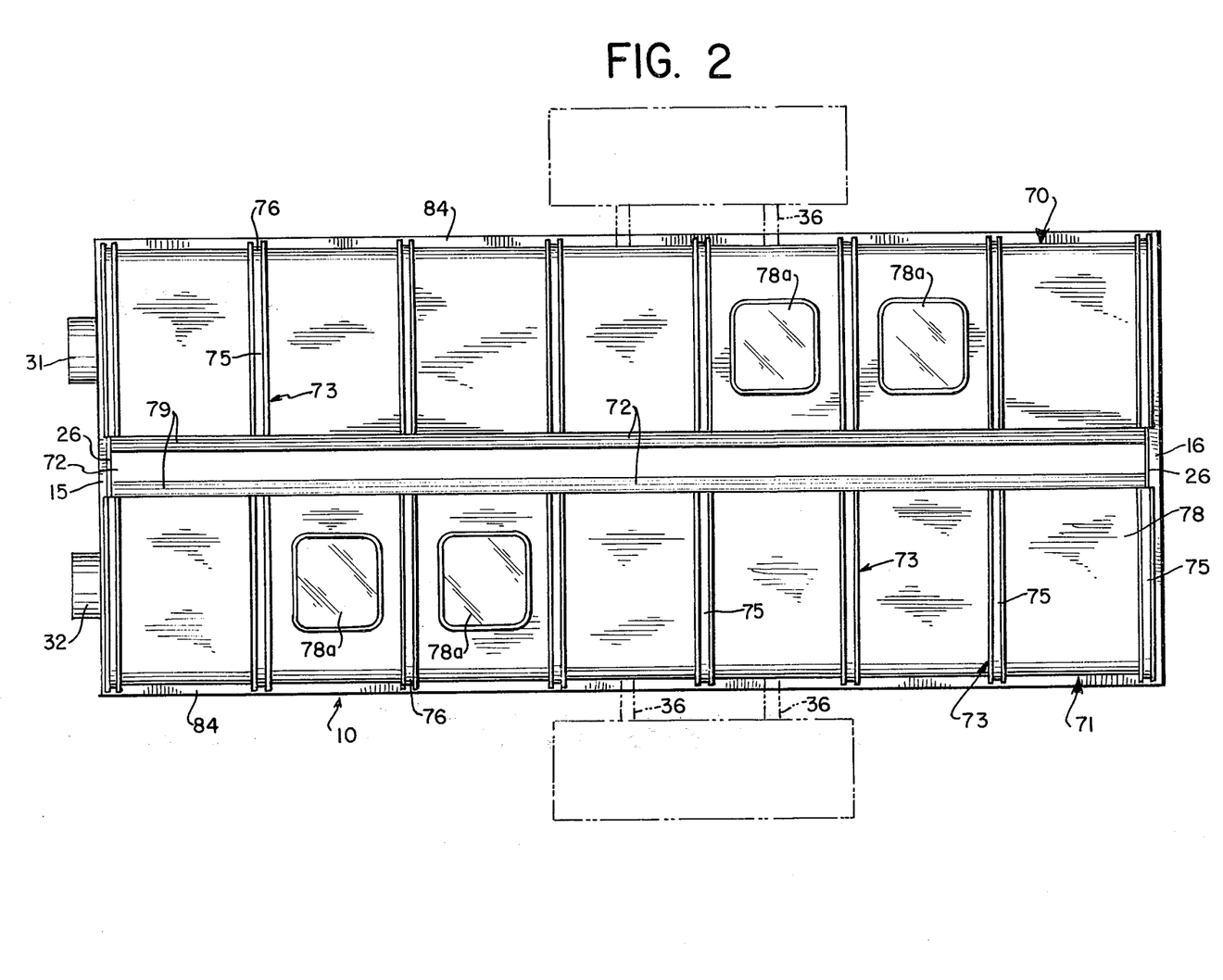
FIG. 2 is a top plan view of the spray booth structure of FIG. 1.

Welded to the inside and lower surfaces of the rib portions 75 are roof panels 78 which, in one or more sections, extend for a full length of the housing section, interconnecting and adding rigidity to the assembly of rib sections 73. Desirably, the roof panel 78 includes inner, slot forming flange sections 79 defining the conveyor receiving slot 72 in the assembled structure. The horizontal upper portions 80 of the roof panels are welded to the upper portions 75 of the ribs, and the curved portions 81 of the panels are likewise welded to the curved portions 76 of the ribs. The outer portions of the roof panels extend downward a short distance from the top of the housing and, in accordance with the invention, the lower extremities of the roof panel section remain free of the supporting ribs 73 to form a free skirt 82. Thus, as reflected particularly in FIG. 5, the welded attachment of the panel 78 to the ribs 73 continues around the curved part 76 and down to a terminal point 83. From that point on down to the lower edge of the panel section, the panel skirt 82 is free of the support and capable of being flexed inward therefrom to receive other panels of the housing assembly as will appear. As reflected in FIG. 2, window panels 78a may be provided in the roof panels to admit lighting from external sources.

At their lower ends, the housing sections 70, 71 are provided with a flange strip 84, which extends around the bottom of the housing section and is welded or otherwise secured to the lower extremities of the ribs 73 and supports 77. The flange strip 84 is provided with a plurality of openings (not shown) aligned with a plurality of openings in the channel sections 13–16, for receiving connecting bolts 85. In accordance with the invention, the internal dimensions of the flange strip 84 correspond with those of the channel structure 13–16 of the hopper support. The arrangement is such that the housing structure, consisting of the sections 70, 71 may be placed over the hopper structure and bolted thereto, with the ribs 73 and vertical supports 77 located immediately outside of the upstanding lips 22, 23, 26 of the hopper walls.

In the illustrated form of the invention, end wall panels 86, 87 are welded to the inside surfaces of the support channels 77 and serve to define the end openings 33 of the spray booth housing. Desirably, the end openings 33 are no greater in size than necessary to accommodate the largest size of part to be carried by the conveyor, taking into account normal swinging and turning movements of the part as it moves with the conveyor. In addition, it is contemplated that additional, removable end wall panels (not shown) may be provided, to enable the end opening 33 to be reduced in size and changed in shape, as necessary or desirable, when smaller parts are being handled.

In accordance with one aspect of the invention, the full length end panels 87 are arranged to have an inward overlapping or inwardly shingled relationship with the upwardly extending hopper lip 26 (see FIG. 4). Thus, the panels 87 are welded to the end supports 77, as well as to the end ribs 73, but terminating short of the lower end extremity of the panel, to form a flap section 90, as reflected in FIG. 4. The arrangement is such that, when the individual housing sections 70, 71 are initially assembled in place on the hopper structure, the end panel flaps 90 are deflected inwardly, so as to lie on the insides of the hopper lips 26. This provides for the desired inwardly shingled relationship between the panels 87 and the lips 26 to facilitate the cleaning of powder overspray particles from the panel walls.

In accordance with another aspect of the invention, some and preferably all of the rib elements 73 are arranged in a uniformly spaced relationship along the length of the housing sections 70, 71. Thus, the skeleton structure of the housing sections 70, 71 is such as to provide uniform rectangular openings along the sides of the housing. In the assembled structure, the openings extend vertically from the lower lip 91 of the roof panels 80 to the upper edges of the hopper lips 22, 23, 26. The sides of the openings are defined by the side edges of the rib sections 73 themselves. Pursuant to the invention, these uniform side wall openings are closed off by means of a plurality of side panel module sections, each of a standard, uniform overall size and shape, but each having individual features desired for the arrangement of the specific booth structure in question. In all cases, the modular panel units are arranged for installation in the booth structure in a manner providing for an inwardly shingled internal wall surface to facilitate downward flow and clearance of powder overspray particles.

Figure 1:
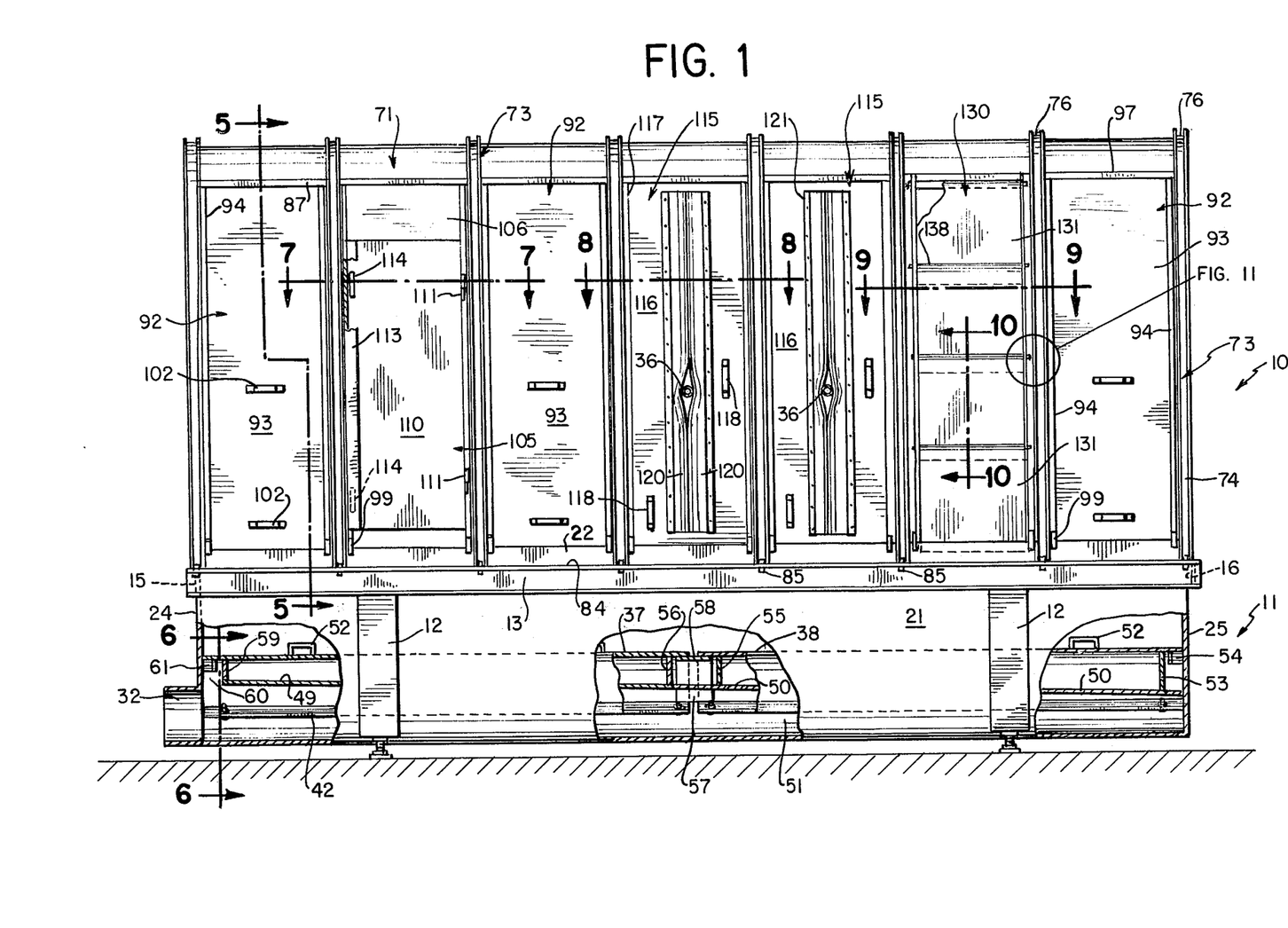
FIG. 1 is a side elevational view of a powder recovery spray booth assembly incorporating the features and advantages of the invention, with parts broken away to illustrate details of construction.

Referring initially to FIGS. 1 and 5 of the drawing, the reference numeral 92 refers to a standard form of closed wall panel comprising a flat section 93 of sheet metal of a width substantially equal to the center-to-center spacing between ribs 73 and of a height greater than the spacing between the lower extremity 91 of the roof panel skirt and the upper extremity of the hopper lip. Along the outside surface of the sheet metal panel 93 are welded a pair of angle sections 94, which extend vertically, adjacent the side edges of the panel. The angle sections are spaced inwardly somewhat from the edge extremities of the panel 93, enabling the outwardly projecting flanges of the angle sections to be received closely between a spaced pair of the rib elements 73. The lower ends 95 of the angle sections terminate a few inches above the lower edge extremity 96 of the panel, as reflected in FIG. 5, and the lower edge 95 forms an abutment surface adapted to engage the upper edge of the hopper lip 22. At their upper ends, the angle sections 94 may also terminate below the upper extremities of the panel 93 and, preferably, the upper edge of the panel has a flap like section 97 which is folded over flat against the front surface of the panel.

Welded to the inner flanges 98 of the angle members are positioning lugs 99, advantageously provided with outwardly bent lower tabs 100. The locating lugs 99 extend somewhat below the lower extremities of the angle members 94 and are arranged in conjunction with the projecting lower portions of the panels 93 to embrace the upper edge of the hopper lip 22 to position and support the lower end of the panel assembly 92.

As reflected particularly in FIG. 5, the lower extremity 83 of the weld, by which the roof panel 78 is attached to the rib elements 73, lies well above the upper edge extremity 101 of the standard panel 92, when the latter is in its installed position. The free space of the panel skirt 82, above the edge 101 is somewhat greater than the downward projection of the locating lug 99 below the abutment surface 95. Thus, installation of the panel assembly 92 into the overall housing structure may be accomplished by initially inserting the entire panel through the appropriate opening, so that the panel lies entirely inside of the housing skeleton. The upper edge of the panel is then inserted between the free skirt flap 82 of the roof panel and the spaced pair rib members defining the opening to be filled in by the panel. When thus inserted, the panel assembly 92 is forced upwardly a sufficient distance to enable the locating lugs 99 to clear the upper edge of the hopper lip 22. The lower edge of the panel is then drawn forward, until the lower edge of the panel engages the inside surface of the hopper lip. The entire panel assembly is then pushed downward, until the abutment surfaces 95 of the angle members 94 engage the hopper lip. As will be apparent in FIG. 5, the arrangement thus described enables the panel assembly 92 to be securely locked into the housing structure, with the roof panel skirt flap 82 extending below and inside of the wall panel upper edge, in the desired inward shingle fashion, and with the lower edge of the removable panel extending inside and below the upper edge of the hopper lip 22, also in the desired shingle fashion. Typically, the panel assembly 92 may be provided with suitable handles 102 (FIG. 1) to enable the panels to be equally gripped for installation and removal.

As will be appreciated, and as will be further described, standard panel modules may be provided, having a variety of structural and functional features, but in each case interchangeably insertable in an open space in the housing skeleton, in the manner just described relating to the panel 92. Accordingly, with a standard housing skeleton structure, and a plurality of panel modules of various functional and structural characteristics, the spray booth housing may be quickly assembled to custom specifications, and may be quickly and easily rearranged subsequently, to accommodate such changes as may be necessary or desirable.

With reference now to FIG. 1, the spray booth housing therein shown includes a variety of forms of wall panel modules, which are representative of the types of panel modules that may be employed. The arrangement in which the panel modules are employed in FIG. 1 does not necessarily reflect a desirable commercial arrangement, but merely illustrates the typical variety of panels that might be usefully employed in the construction of custom spray booth housings for specific purposes. Thus, in FIG. 1, the housing is shown as having seven panel modules on each side. On the illustrated side, the first, third and seventh panels, starting from the left, are of standard wall panels 92, as just described. The second panel is a special access door panel, which may be opened from time to time for various purposes, such as to permit an operator to perform touchup spraying, as the workpiece travels from right to left through the housing. The fourth and fifth panels are special sealing panels arranged to receive vertically reciprocating spray gun units 36. The sixth panel is a special louvered panel arranged to provide for the downwardly directed inflow of outside air, as may be advantageous under certain circumstances.

Figure 7:
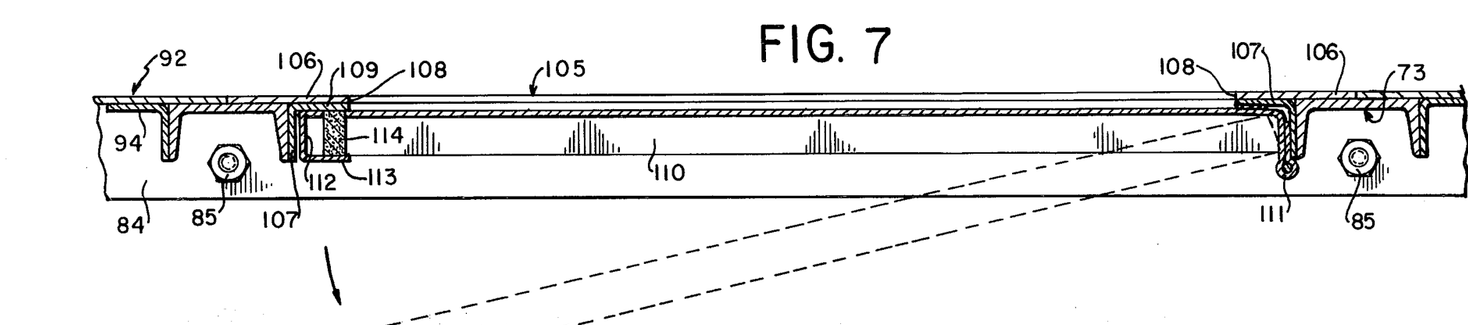

With reference now to FIG. 7, there is shown a cross sectional configuration of an access door panel assembly, generally designated by the reference numeral 105. The door panel assembly includes a frame section 106 of flat sheet metal material, the peripheral configuration of which corresponds substantially to that of the standard closed panel 92, including the provisions of vertically disposed angle members 107, which correspond in function to the angle members 94 of the closed panel 92. A sheet metal frame section 106 is provided with an access opening 108, which may extend over as far as the inner flanges 109 of the angle members but which terminates short of the upper and lower extremities of the frame panel 106. Thus, the frame panel 106 has upper and lower margins and side margins, by means of which the entire panel assembly may be bodily inserted in an opening in the structure and then installed by first slipping the upper edge of the frame panel under the free skirt flap 82 of the roof panel. The door panel 105 is also provided with positioning lugs 99 adapted to overhang the front of the lip 22, while the lower margin of the frame projects downward behind the lip in the manner desired.

An access door 110, typically formed of sheet metal, is supported by a plurality of hinges 111 at one side, which are welded to the outwardly extending flange of one of the angle members 107. At the other side, the access door is provided with an outwardly extending flange 112 and an inwardly extending flange lip 113, by means of which the door may be conveniently gripped for opening and closing. Magnetic elements 114 are advantageously utilized to maintain the door in closed position. In this respect, it is desired to avoid latch means or the like projecting through the wall structure into the interior of the housing, as any such projections could form surfaces for retaining deposited powder overspray. Likewise, insofar as is practicable, welded, rather than bolted construction is utilized in the housing to avoid bolt or nut projections from the interior walls.

As reflected in FIG. 7, when a series of panel modules are installed in the housing skeleton frame, the opposed edges of adjacent panels are in substantially butting relationship, with perhaps 1/16 to ⅛ inch clearance between to accommodate normal manufacturing tolerances, expansion and contraction, etc.

Figures 8, 9:
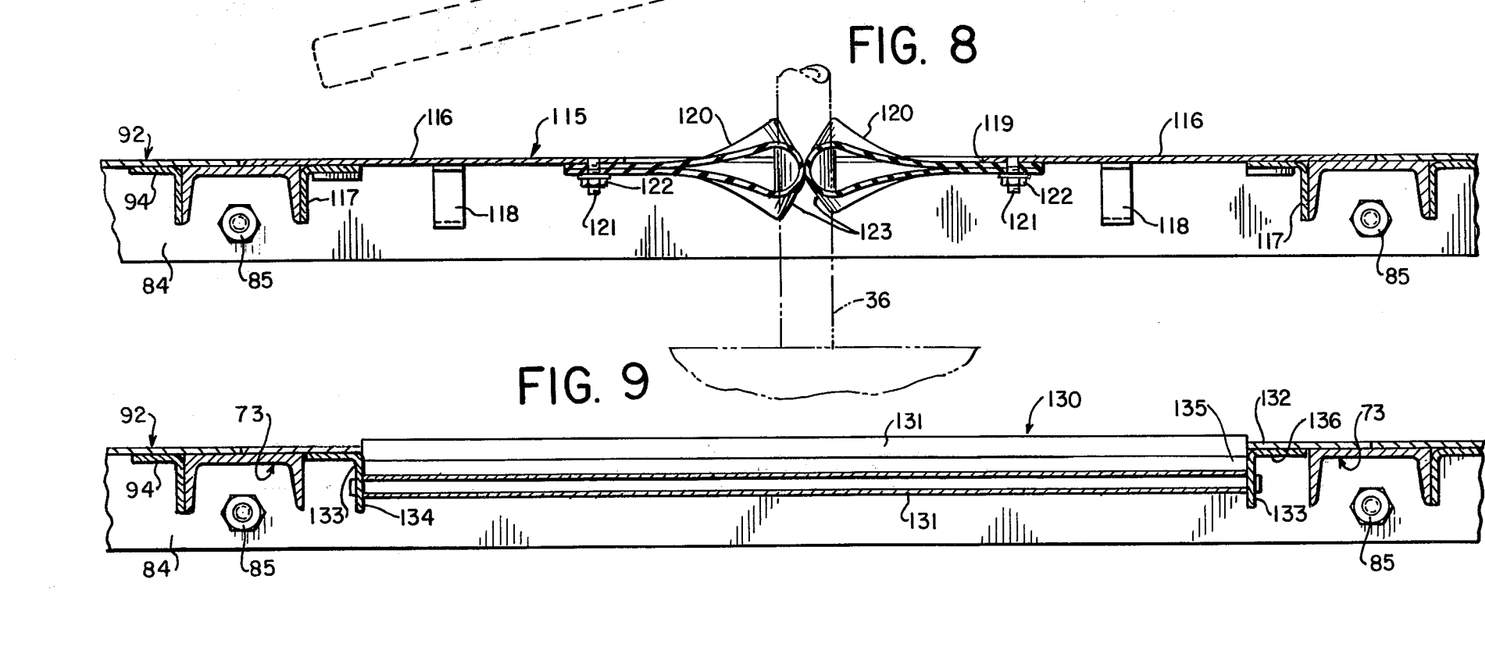

With reference to FIG. 8, there is shown a sealing panel generally designated by the numeral 115, which consists primarily of a flat sheet metal panel 116 provided with vertically disposed angle members 117 adjacent its side edges and otherwise having an edge construction similar to the standard closed panels 92 to accommodate easy manual insertion and removal in the same manner as the panel 92. Suitable handles 118 may be provided to facilitate such handling. In the center of the sealing panel there is provided a vertically elongated opening 119, which extends throughout a substantial portion of the length of the panel, but terminates short of its upper and lower end extremities.

Secured to the vertical edges of the panel 116, adjacent the opening 119, are flexible sealing elements 120, and these typically are attached by means of a plurality of stud bolts 121 and nuts 122. The studs 121 advantageously are welded to the sheet metal of the panel 116, to avoid any internal projection on the inside of the housing. To advantage, the sealing elements 120 are formed of a suitable resilient, flexible sheet-like material, such as neoprene. The sheet material is folded into a double thickness configuration, with the free edges being secured together by the rows of fastening nuts 122. As reflected in FIG. 8, the arrangement of the folded over sealing elements 120 is such that an opposed pair of the sealing elements are butted together under compression in the plane of the panel to form a normally closed but openable vertical slot. The geometry of the sealing elements and the mounting thereof is such that the two sealing elements are butted together under some degree of compressive force at the centerline, causing the doubled over folded edge of the sealing elements to bulge out into a somewhat rounded configuration, as reflected at 123 to form a tight seal with each other.

The resilient seal formed by the elements 120 accommodates the entry of reciprocator elements 36, which may be electrostatic powder spray guns or, more typically, will be reciprocator arms which will mount the spray guns internally of the spray booth housing. In any case, as reflected in FIG. 1, the particular configuration of doubled over and compressed sealing elements accommodates the entry and vertical reciprocation of the elements 36, with the sealing elements functioning to close and reseal only a short distance above and below the through-projecting elements 36. In this respect, the looped and butted sealing element configuration is substantially superior to the more conventional configuration of overlapped resilient elements, in that the reclosure of the sealing elements above and below the through-projecting element 36 occurs in a much shorter distance in the arrangement of the invention.

Referring now to FIG. 9, there is shown a special louvered panel structure, generally identified by the reference numeral 130 and comprising a plurality of hinged louvered panels 131. The panel structure includes a sheet metal frame section 132, defining vertical side margins and top and bottom margins, for installation in the skeleton structure of the housing, substantially in the manner heretofore described with respect to the other panels. A pair of vertically disposed angle members 133 is secured to the front of the panel frame 132, and the outwardly projecting flanges 134 thereof serve to define the side edges of a large panel opening extending generally from the top to the bottom of the panel structure, except for the sheet metal margins at the top and bottom. Typically, the angle members 133 are secured by welding of the inner flanges 136. The outer edges of the last mentioned flanges also cooperate with the sides of a spaced pair of rib members 73 to position the panel assembly properly in its installed relationship.

In the illustrated arrangement, the louvered panel assembly includes four louvered panels 131, although it will be understood that any appropriate number of louvers may be utilized. The individual louvers, as shown in FIG. 10, are of sheet metal construction folded at their upper edges 138 and welded at their lower extremities 139 to provide a downwardly tapering double walled louver. Pivot pins 140 are welded inside the upper edges of the louvers and extend through appropriate openings in the angle member flanges 134 to accommodate pivoting movement. The lower portion of each louver panel overlaps the upper portion of the one below it, and the lower edge of the lowest louver extends below and overlaps on the inside the hopper lip 22 (or 23, as the case may be).

Typically, there is enough friction in the pivoting arrangement of the louver panels 131 that the louvers will remain in any position in which they are manually set. However, where necessary or desirable, appropriate holding means may be utilized. In typical operation, the louvered panels may be opened slightly to the inward, providing for the downwardly directed flow of outside air along the wall section formed by the louvers. The louvers, of course, overlap on the inside, so that the desired shingle configuration is realized. In addition, the constantly moving wall or boundary layer of air flowing down along the panel assembly as it enters from the outside tends to continually cleanse the louvered panel section.

In the spray booth arrangement shown in FIG. 1, a variety of wall panel modules is shown installed in a booth structure, not necessarily as representing an especially advantageous arrangement of such panels but merely showing the variety of panels which may be installed. Frequently, an entire wall of the housing might be made up of louvered panel assemblies 130, for example, as where the spray coating devices were positioned all on the opposite side of the spray booth. Thus, the overspray particles issued from the spray gun devices and traveling past the workpiece as it is conveyed longitudinally through the booth may tend to be carried toward the back wall of the spray booth. In such cases, the overspray particles would be intercepted by the downwardly flowing boundary layer, simultaneously cleansing the back wall of the housing and causing the overspray particle to be migrated downward toward the hopper trough, where the particles can be picked up in the high velocity outflows and extracted from the booth. The louvered panel assemblies also are highly useful in regulating the pattern of air flows within the spray booth housing. Thus, if under a given set of conditions the air flow velocities downward to the center slot 72 and inward through the end openings 33 tend to be excessive in any respect, outside air may be permitted to flow in through one or more of the louvered panels in greater volume than otherwise, such that the necessary pressure balances within the housing are achieved by downward air flow along the outside walls, with the effect of reducing the velocity of flow around the workpieces themselves.

The spray booth structure of the invention is highly advantageous in that, among other things, it may be easily and inexpensively customized to the specific needs and requirements of the customer, by simply making an appropriate selection of modular panel assemblies and installing those assemblies appropriately in the basic skeleton structure of the booth housing. Moreover, where the customer requirements are changing with changes in product line (e.g. a given product may require more or fewer reciprocating spray devices) the customer may equip himself with extra modular panel assemblies of appropriate type, enabling him to re-customize the booth structure from time to time as appropriate. The recustomizing operation, of course, can be completed in a few minutes time, merely by exchanging and/or relocating various types of the modular panel assemblies.

In addition to the high degree of construction flexibility, the spray booth assembly of the invention is extremely efficient in terms of its self-cleansing characteristics. All of the modular panel assemblies, when snapped into place, have an inwardly shingled relationship with the other panels of the booth, avoiding upwardly facing surfaces on which powder overspray can be deposited. Insofar as is practicable, all of the surfaces in the interior of the spray booth are disposed at a large angle (around 60° or more) to the horizontal, experience having shown that the powder overspray tends to slide easily downward along surfaces so inclined. This avoids undesirable and sometimes unsafe accumulations of powder within the interior of the booth.

Another advantageous feature of the invention resides in the provision of adjustable hopper baffles, providing for a controlled distribution of vertically downward air flows over the transverse cross section of the spray booth. By providing, in combination with a hopper bottom of W-configuration, a pair of adjustable hopper baffles in each of two longitudinally extending hopper troughs, it is possible to provide for a relatively increased downward flow of air long the outside of the booth walls and a relatively decreased flow of air down the center of the booth, in the vicinity of the workpiece to be coated. This simultaneously increases deposition efficiency and spray booth cleansing, both highly desirable objectives.

In addition to the above, the various wall panels and the adjustable hopper baffles are so constructed and arranged as to accommodate easy and fast removal and replacement, as may be necessary from time to time for clean out of the spray booth.

It should be understood, of course, that the specific form of the invention herein illustrated and described is intended to be representative only, as many changes may be made therein without departing from the clear teachings of the disclosure. Accordingly, reference should be made to the following appended claims in determining the full scope of the invention.

I claim:

1. A spray booth structure for a coating system, which comprises
   a. a skeleton structure defining a spray booth housing frame and including at least one pair of horizontally spaced, vertically extending structural rib elements,
   b. a roof panel extending between said rib elements and forming an upper part of said spray booth housing,
   c. said roof panel having a skirt portion extending downward for a distance along said rib elements but unattached thereto,
   d. a panel-receiving lip element in the lower portion of said spray booth housing extending horizontally between said rib elements and upwardly for a distance along said rib elements,
   e. said lip element forming an open space between the top of the lip and the bottom of the skirt, and
   f. a removable side wall panel assembly formed in part of sheet-like construction and having width and height dimensions greater than those of said open space,
   g. said wall panel assembly enclosing a portion of the spray booth and having an upper margin received between said skirt and said rib elements, side margins received inside of said rib elements, and a bottom margin received inside of said lip.

2. A spray booth structure according to claim 1, further characterized by
   a. said wall panel assembly including positioning means for supporting the lower end of said assembly in relation to said lip, and
   b. said wall panel assembly being held in place in said booth structure substantially by its upper and lower margins.

3. A spray booth structure according to claim 2, further characterized by
   a. said positioning means comprising a positioning lug secured to the front face of said wall panel assembly and extending downwardly in spaced relation thereto, and
   b. said lip being engaged between the lower margin of said panel assembly and said positioning lug.

4. The spray booth structure of claim 2, further characterized by
   a. said wall panel assembly comprising sheet metal means forming said side margins and said upper and lower margins,
   b. angle members secured to the front face of said panel assembly and extending vertically upward along the respective side margins, and
   c. said angle members serving to strengthen said sheet metal sections and to cooperate with said rib elements to position said panel assembly in said booth structure.

5. A spray booth structure according to claim 4, further characterized by
   a. said angle members terminating above the lower edge of said panel assembly and forming supporting abutment means for engagement with the upper edge of said lip.

6. A spray booth structure according to claim 1, further characterized by
   a. said rib elements extending vertically upward and being bent around to extend inward toward the center of the booth structure, and
   b. said roof panel being secured to the inwardly extending portions of said rib elements, to form a top wall of the booth, and extending around the bent-over portion of the rib elements and downward for a distance along the vertical portions thereof.

7. A spray booth structure according to claim 1, further characterized by
   a. said wall panel assembly comprising a substantially closed wall panel formed of a generally flat section of sheet metal.

8. The spray booth structure of claim 1, further characterized by
   a. said wall panel assembly comprising a plurality of louver panels pivoted near their upper edges about horizontal axes and extending downward in inwardly overlapped relation, and
   b. said louver panels, when partially opened, accommodating downward flow of outside air along the inside walls of the spray booth structure.

9. A spray booth structure according to claim 1, further characterized by
   a. said wall panel assembly having an access door therein, and
   b. said access door being hinged for outward opening to accommodate access to the interior of said spray booth while workpieces are being conveyed there through.

10. A spray booth structure according to claim 1, further characterized by
 a. said wall panel assembly having a vertically elongated slot for the reception of a reciprocating element, and
 b. sealing elements extending vertically along each of the side edges of said opening and meeting in the center thereof to provide an openable seal for accommodation of a moving reciprocating element, said sealing elements comprising sections of sheetlike, resilient material folded and secured with their folded edges in pressure butting relationship to form a seal.

* * * * *